S. C. Riley,
Cooking Utensil.

No. 2,767.  Patented Aug. 31, 1842.

S. C. Riley,
Cooking Utensil.
No. 2,767. Patented Aug 31 1842.

UNITED STATES PATENT OFFICE.

SALMON C. RILEY, OF NEW YORK, N. Y.

CONSTRUCTION OF UTENSILS FOR COOKING-STOVES.

Specification of Letters Patent No. 2,767, dated August 31, 1842.

*To all whom it may concern:*

Be it known that I, SALMON C. RILEY, of the city of New York, in the State of New York, have invented a certain new and useful improvement in utensils to be used with cooking-stoves of various kinds, but which are furnished with oval or elongated holes or openings in the top plate for the admission of kettles, stew-pans, and other articles usually employed with such stoves.

The principal objects that I have in view in the construction of the improved utensils employed by me are, first, the carrying off of the vapors arising from articles which are being cooked, such vapors being carried off along with the heated air and the gases produced by the combustion of the fuel, in the passage of such heated air and gases from the fire to the stove, or exit, pipe, through the flue below the top plate of the stove; and, secondly, the adapting of certain utensils to the purpose of cooking, or of heating, various articles, and which are generally used in conjunction with what I call the principal piece; but which are formed in such manner as will give to them the property possessed by the principal piece, of allowing vapors arising from them to be carried off beneath the top plate of the stove; and I do hereby declare that the following is a full and exact description of my improvements.

In Sheet 1, and Sheet 2, of the accompanying drawings, I have represented the various utensils used by me; those shown in Sheet 1, being drawn to a scale of three inches to the foot, and those shown in Sheet 2, to a scale of six inches, the utensils being supposed to be of a medium size; they, however, will vary with the variations in the sizes of the stoves to which they are applied.

Figure 1:
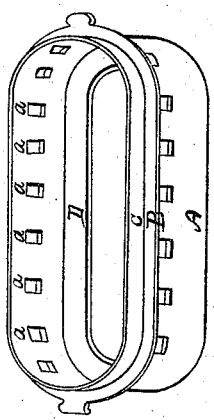

Figure 1, represents what I denominate the principal piece, which is to be made of such size as to adapt it to the oval, or elongated, opening in the stove to which it is to be applied; this principal piece being made of several sizes, to suit the various cooking stoves furnished with oval openings. A, is the part of said principal piece which is to fit into the opening in the stove, and is to descend as deep into the flue space as to come into contact, or nearly so, with the lower plate of the flue space. B, is a flanch which is to rest upon the top plate of the stove, and which will adapt it to stoves having slight differences in the form, or size, of the opening; a rim C, may be allowed to rise above the flanch B, when it is desired to increase the depth of the principal piece, or this rim may be omitted. D, is a flanch, or rim, at the lower end of, and within, the principal piece, upon which cooking, or other, utensils placed within it, are to be supported. *a*, *a*, *a*, are openings through the sides of the principal piece, for the admission of heated air from the fuel, and for the escape of the vapors from articles which are being cooked. The openings are represented as nearly square in the drawing, but they may be elongated so as to extend down to the rim D. The flue space being obstructed by this principal piece, the larger portion of the heated air will be compelled to pass through the openings, *a*, *a*, *a*.

Figure 2:
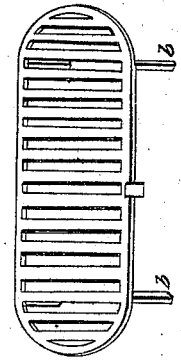
Figure 3:
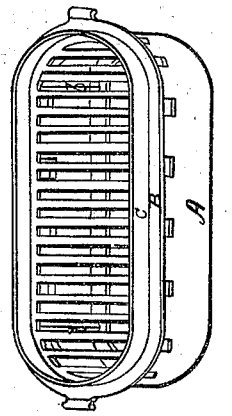
Figure 4:
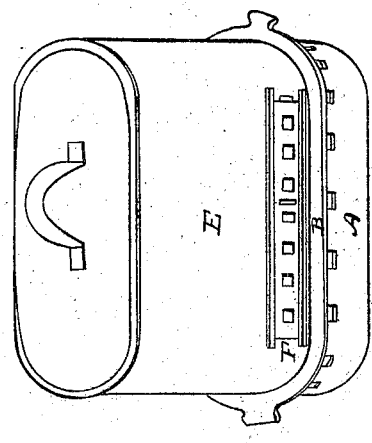
Figure 8:
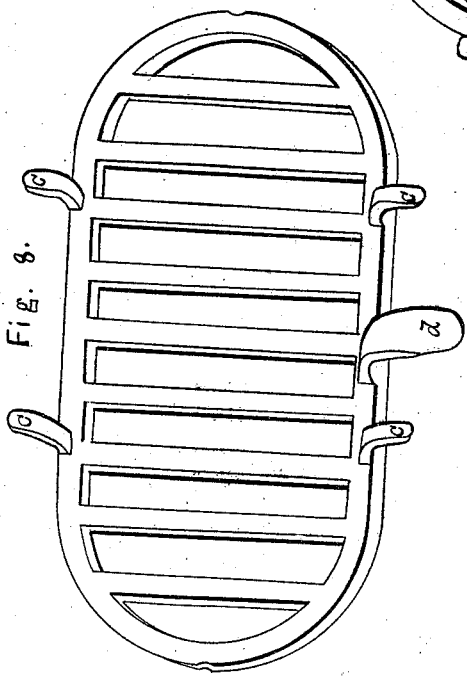

Fig. 2, represents a gridiron, or grated broiler, furnished with legs *b*, *b*, that rest upon the rim D, and which is shown in place in Fig. 3. Its upper surface should be above, or level with, the tops of the openings *a*, *a*, *a*. When this broiler, or other cooking utensil, is in use, a cover is to be placed over the principal piece, as shown at E, in Fig. 4. This cover is represented as furnished with a sliding damper, or register, at F, but this is not a necessary appendage; as holes may be made in the cover, not only without endangering the escape of vapors, but as there will be an inward draft through them they are necessary to the carrying down of such vapors. The gridiron, or broiler, may be made without legs, and have small ears, or projections, *c*, *c*, *c*, Fig. 8, to rest on the principal piece, and a handle *d*, which may pass through a hole made to admit it in the cover E.

Figure 5:
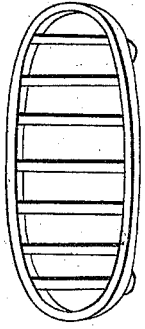
Figure 6:
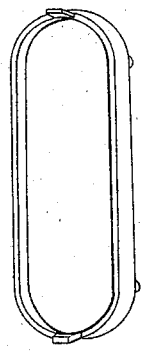

For the purpose of heating smoothing irons, a grating, such as is shown at Fig. 5, may be dropped onto the ledge D, and the top of the principal piece may then have a close cover on it, the downward draft not being required. In some cases, articles to be heated, or roasted in the manner of potatoes, may be put into a pan, such as is shown at Fig. 6, which may rest upon the rim D; but for frying in general, I use a pan, or griddle, such as is shown in Fig. 7, which is to rest on the top of the principal piece; and to admit the descent of the vapors from such pan, offsets are made, and an opening is left at one side, or at both sides, of it, as shown at *e, e;* or the opening, or openings, may be made as shown at *f, f,* Figs. 9 and 10.

Figure 7:
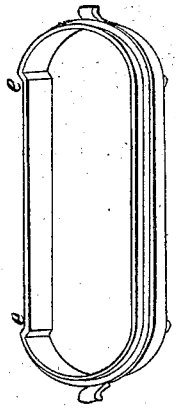
Figure 10:
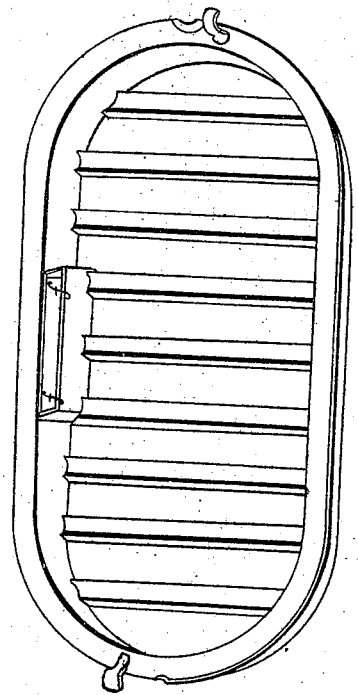
Figure 9:
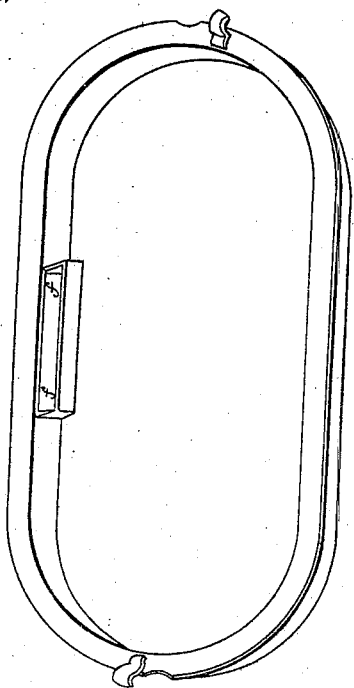

The utensils shown in Figs. 7, 9, and 10, may be used without the principal piece; that is, they may be placed directly in the opening in the stove top, and have the cover E, placed over them, the recesses, or apertures, in these utensils allowing the vapors to descend, and pass under the top plate of the stove, to the exit pipe, along with the heated air from the fire. When the utensils shown in Figs. 7, 9, and 10, are employed without the principal piece, their inner rim, or sides, G, G, should be sufficiently deep to allow the vapors to escape through the openings at *e, e; f, f;* below the thickness of the stove plate.

Having thus, fully described the nature and use of my improved utensils to be used with cooking stoves of that kind which have oval, or elongated, openings in their top plates, what I claim therein as new and desire to secure by Letters Patent, is—

1. The manner of constructing and using the utensil which I have denominated the principal piece; its construction being such as to enable it to receive the respective auxiliary utensils herein described, and to admit of the vapors arising from articles which are being cooked to descend and be carried off with the heated air and gases from the fire, in their passage to the smoke pipe, along the flue leading from the fire chamber thereto.

2. I also claim the construction and use of the cooking utensils, as represented in Figs. 7, 9, and 10, of the accompanying drawings, whether used with, or without, the principal piece, but being furnished with openings through which the vapors may descend into the flue below the upper plate of the stove, when they are used for cooking, and a cover is placed over them.

SALMON C. RILEY.

Witnesses:
 MORRIS M. DAVIDSON,
 CHARLES BEST.